May 7, 1968 L. W. SMITH 3,381,435
SEALING STRIP CORNER CONSTRUCTION
Filed July 29, 1966

INVENTOR.
LEONARD WILLIAM SMITH
BY
Thomas W. O'Rourke
ATTORNEYS

United States Patent Office 3,381,435
Patented May 7, 1968

3,381,435
SEALING STRIP CORNER CONSTRUCTION
Leonard William Smith, Stevensville, Mich., assignor to Ball Brothers Company Incorporated, Muncie, Ind., a corporation of Indiana
Filed July 29, 1966, Ser. No. 568,883
6 Claims. (Cl. 52—400)

ABSTRACT OF THE DISCLOSURE

A sealing or glazing strip corner construction having a forced generating means disposed diagonally at the corner to produce a sealing force across the corner portion.

This invention concerns sealing strips for securing panels or windows within apertures. More particularly, this invention concerns an improved corner construction for elastomeric sealing strips.

A popular sealing strip is that commonly known in the trade as the H cross-section type incorporating locking strip means. Two channels are formed by the legs of the H configuration. A support projection in the aperture is fitted into one of two channels formed by the H configuration sealing strip. The panel to be mounted is fitted into the other channel of the sealing strip and the locking strip secured. Since the support projection circumscribes the aperture, and thus, in a spaced apart but similar manner, the panel is securely mounted in the aperture.

The locking strip means includes an undercut groove in one side of the sealing strip. Generally, this groove is roughly aligned with the crossbar of the H configuration. An expansion strip complementary in shape to the groove, and preferably somewhat oversized relative to the groove, is forced into the groove. Though the strip may be formed of any solid material, it is advantageously of the same material as the sealing strip proper. A preferred configuration of the locking strip means is described in U.S. Patent Number 2,288,329. In this embodiment, the expansion strip and groove are connected at one edge, thereby making the expansion strip an integral part of the sealing strip.

Two important functions are served by the locking strip means. It is necessary that one side of one channel of the H configuration be deformable in order to permit placement of the panel in the channel. The groove produces an integral hinge and allows the channel sides to be reversibly deformed. Also, after the panel is located in the sealing strip, the sides of the channel must be forcibly urged against both the support projection and the panel to provide adequate sealing pressure and prevent deformation of the channel side. The somewhat oversized expansion strip provides the needed force to produce adequate sealing pressure along the length of the sealing strip.

For the most part, the H cross-section sealing strip is an entirely satisfactory means of mounting panels or windows in apertures. This is particularly true when the corners of the apertures are gently rounded with fairly large radii. However, when square corners such as those usually desired in buildings are used, it is difficult to obtain proper sealing between the outside corner of the strip and the support projection. This results from the fact that the expansion strip produces forces perpendicular to the length of the groove. Since the groove is disposed inwardly toward the aperture relative to the sealing sides of the outer channel, and since two grooves and two outer channels form a juncture at the corner, it will be appreciated that the force producing sealing strip means cannot be positioned inwardly in a direction normal to the entire length of both extreme edges of the channels. This is true whether the corner is mitered together at, as is most conventional, a 45° angle at the end of each strip or if the corners are merely butted together. A serious sealing problem may result if force generating means are not provided throughout the corner section to seal the outer corner. The problem of sealing the outer extremes of the corner portion of the sealing strip, as well as a proposed solution to the problem, is discussed in U.S. Patent Number 3,009,216.

It is an object of the instant invention to provide a corner construction for sealing strips which maintains the integrity of the seal at the outer extremes of the corner.

Another object of the instant invention is to provide a corner construction which can produce a sealing force oriented toward the extreme portion of the outer corner construction.

Yet another object of the instant invention is to provide a corner construction which can be quickly and easily installed.

Other objects and advantages of the instant invention will be apparent from consideration of the drawings and discussion.

According to the instant invention, an improved corner construction is provided by incorporating a force generating means primarily oriented in a direction toward the outer extreme of the corner section. Such force generating means include, and advantageously are, insert members. The configuration and function of these insert members are similar to the sealing force generating construction of the locking strip means. Instead of attempting to overcome the lack of sealing force in the corner extreme, as by providing secondary seals, the force generating means of the instant invention obviate the need for such seals by producing the force needed to provide adequate sealing in the outer extremes of the corner section. Other force generating means include, for instance, spring members and pneumatic members.

The preferred insert members may be separate pieces fitted into the corner section in a manner analogous to the insertion of a separate expansion strip, i.e., there being undercuts in the corner portion and ridges in the insert member to engage the undercut portions. Obviously, the insert members could be constructed of wood, metal or any other rigid or resilient material. However, the insert members are preferably elastomeric and of the same material as the sealing strip proper. Also, the insert member is preferably formed as an integral part of the corner construction and attached at one end to the sealing strip with the other end free for insertion at the time of installation.

The construction and operation of the improved corner construction of the instant invention will be more readily understood upon consideration of the drawing in which.

Figure 1:
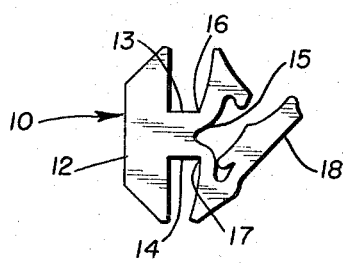
FIG. 1 is a view of the H configuration sealing structure having an open integral locking strip means.
Figure 2:
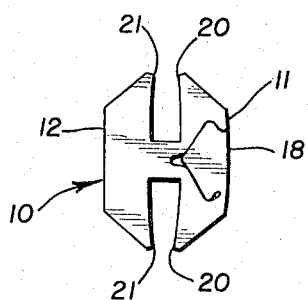
FIG. 2 is a view similar to that of FIG. 1 showing a closed or inserted locking strip.

As shown in FIGURE 1, the basic sealing strip 10 is of an H cross-sectional configuration. Sealing strip 10 has defined therein channels 13 and 14. A groove 15 in the outer portion of a leg section provides hinged portions 16 and 17. It will be noted that hinged portions 16 and 17 are operable as hinges only when expansion strip 18 is not disposed in the groove. However, when expansion strip 18 is in the groove, as in FIGURE 2, resulting leg section 11 is substantially as rigid as leg section 12 which does not have a groove therein. Also, expansion strip 18 urges sealing surfaces 20 toward complementary sealing surfaces 21.

Figure 3:
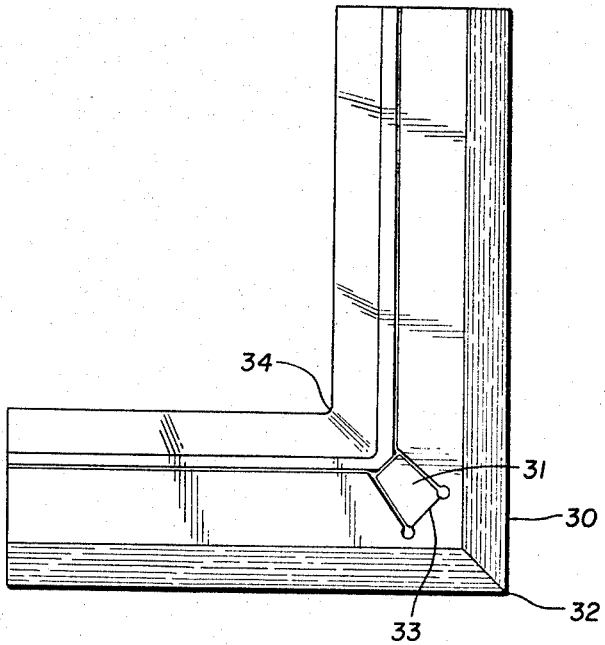
FIG. 3 is a front view of a preferred corner construction of the instant invention.

A preferred corner construction 30 shown in FIGURE 3 utilizes force generating means 31 to produce a sealing pressure in the vicinity of outer corner 32. The specific force generating means 31 illustrated is an integral insert member attached to corner construction 30 along connecting line 33. It will be noted that the insert member is generally disposed on a line between outer corner 32 and inner corner 34. The function of force generating means 30 is to "push" both outer corner 32 and inner corner 34 into sealing engagement with sheets or panels disposed in the channels of the sealing strip.

Figure 4:
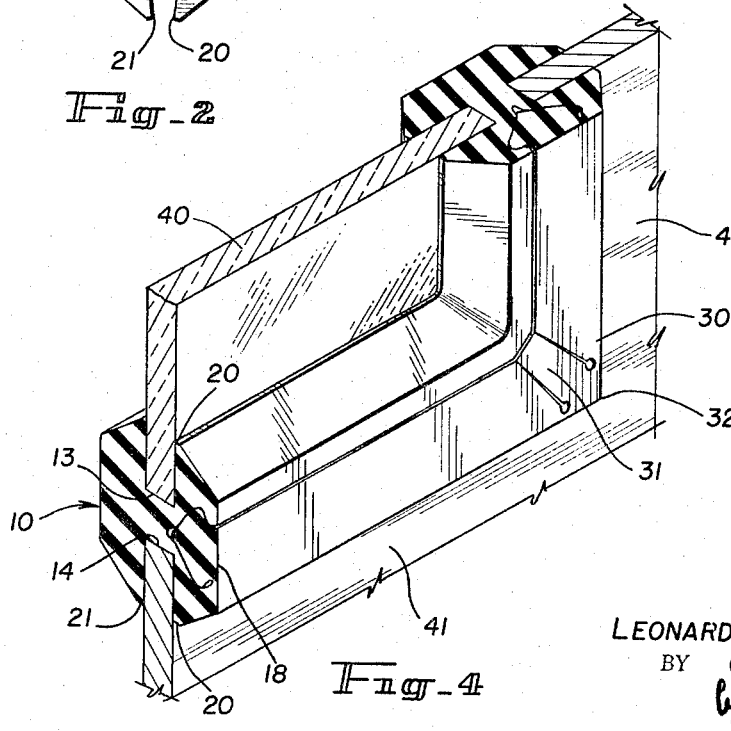
FIG. 4 is a perspective view showing an installed preferred corner construction.

FIGURE 4 illustrates an installed corner construction 30 of the instant invention. Panel 40 and support projection 41 are disposed in channel 13 and 14 defined in sealing strip 10. Expansion strip 18 urges sealing surfaces 30 into sealing engagement with panel 40 and support projection 41. However, in the vicinity of outer corner 32, expansion strip 18 is not capable of producing a sealing pressure. Thus force generating means 31 is utilized to urge the outer corner 32 into sealing engagement with support projection 41.

Sealing strip 10 may be formed of any sufficiently inert elastomer tube which will not degrade or weather under conditions of intended use. Polychloroprene rubber, i.e., neoprene, is a particularly useful material.

Linear segments of sealing strip are conveniently and preferably produced by extruding heated and, if necessary, uncured elastomers through a die. Of course, corner sections cannot be easily produced by this method. It is common practice to produce corner section by injection molding in a sectional die. Improved quality and appearance are obtained if the linear segments are introduced into the injection molding die. By this means a corner section may be formed and joined to the linear segments in a single operation. Obviously, those skilled in the art will have no trouble producing dies to form the various embodiments of the instant invention.

From the above description, it will be apparent that various modifications in means, materials and details may be made within the scope of the invention. Therefore, the invention is not intended to be limited except as may be restricted by the following claims.

I claim:

1. A sealing strip corner construction comprising angularly joined segments of H cross-section sealing strip having locking means, and force generating means positioned between the locking strip means at the juncture of said segments and oriented toward the outside corner of said junction whereby a sealing force may be directed toward and through said outside corner.

2. A sealing strip corner construction as set forth in claim 1 wherein said force generating means is an insert member secured at said juncture substantially along a line between the inner and outer corners of said juncture.

3. A sealing strip corner construction as set forth in claim 2 wherein said insert member is of a resilient material and attached at one end to said corner construction.

4. A sealing strip corner construction comprising angularly joined segments of H cross-section elastomeric sealing strips having defined therein a groove and associated locking strip insert, and an insert member located between the locking strip inserts at the juncture of said segments and disposed along a line between the inside corner and outside corner of said juncture, said member being attached at one end to said juncture portion of said corner construction.

5. Sealing strip configuration for securing and sealing a panel within an aperture having support projections therein, comprising angularly joined elastomeric segments each having defined therein a first channel for accommodating the panel, a second channel defined in the opposite side of each segment as the first channel for accommodating the support projection, an undercut groove defined in each segment in a direction substantially normal to the direction of the first and second channels, an expansion strip complementary in shape to the groove and somewhat oversized relative thereto disposed within the groove, and forced generating means at the joined portion of the configuration located between the expansion strips with the force directed at the intersection of the second channels of the joined segments whereby the sides of the second channels are urged into sealing engagement with the support projection at the intersection of the second channels.

6. A sealing configuration as set forth in claim 5 wherein the forced generating means is an elastomeric insert member attached to the segments at the juncture thereof and disposed substantially along the line between the intersection of the first channels and the intersection of the second channels at the juncture.

References Cited

UNITED STATES PATENTS

| 3,009,216 | 11/1961 | Kimber | 52—400 |
| 3,028,605 | 4/1962 | Lander | 52—400 |
| 3,230,677 | 1/1966 | Brown | 52—400 |

FOREIGN PATENTS

| 691,576 | 5/1953 | Great Britain. |

REINALDO P. MACHADO, *Primary Examiner.*